United States Patent
Ruvalcaba et al.

(10) Patent No.: US 9,100,918 B2
(45) Date of Patent: Aug. 4, 2015

(54) METHOD AND APPARATUS FOR POWER MANAGEMENT OF UICC

(75) Inventors: J. Alfredo Ruvalcaba, San Diego, CA (US); Shriram Ganesh, San Diego, CA (US); Damir Didjusto, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 221 days.

(21) Appl. No.: 13/370,123

(22) Filed: Feb. 9, 2012

(65) Prior Publication Data

US 2013/0039241 A1 Feb. 14, 2013

Related U.S. Application Data

(60) Provisional application No. 61/495,667, filed on Jun. 10, 2011.

(51) Int. Cl.
H04W 52/02 (2009.01)

(52) U.S. Cl.
CPC ............ *H04W 52/0241* (2013.01); *Y02B 60/50* (2013.01)

(58) Field of Classification Search
CPC ............ Y02B 50/60; H04W 52/0241; H04W 52/0225
USPC ............................ 370/331, 311; 455/436–444
See application file for complete search history.

(56) References Cited

U.S. PATENT DOCUMENTS

| | | | |
|---|---|---|---|
| 7,757,094 B2 | 7/2010 | Krishnan et al. | |
| 7,869,806 B2 | 1/2011 | Lim | |
| 8,457,599 B2 | 6/2013 | Ahmavaara | |
| 2004/0022216 A1* | 2/2004 | Shi | 370/335 |
| 2006/0233136 A1* | 10/2006 | Noh et al. | 370/331 |
| 2006/0291483 A1 | 12/2006 | Sela | |
| 2008/0102832 A1 | 5/2008 | Sengupta et al. | |
| 2008/0161049 A1* | 7/2008 | Lagnado et al. | 455/558 |
| 2008/0300008 A1* | 12/2008 | Kim | 455/552.1 |
| 2009/0068969 A1* | 3/2009 | Lindoff et al. | 455/161.1 |
| 2010/0103995 A1 | 4/2010 | Seo et al. | |
| 2010/0285842 A1 | 11/2010 | Venkateswarlu | |

(Continued)

FOREIGN PATENT DOCUMENTS

| | | |
|---|---|---|
| GB | 2466663 A | 7/2010 |
| JP | H09163450 A | 6/1997 |

(Continued)

OTHER PUBLICATIONS

Machine translation of JP2007324778.*
Machine translation of JPH09163450.*
International Search Report and Written Opinion—PCT/US2012/041125—ISA/EPO—Sep. 26, 2012.
Taiwan Search Report—TW101120707—TIPO—Aug. 11, 2014.
Genba Y., "Ever Expanding Mobile Businesses", Digital Media Front Line, Japan, Nikkan Kogyo Shimbun, Ltd., Dec. 20, 2000.

*Primary Examiner* — Paul H Masur
(74) *Attorney, Agent, or Firm* — Donald C. Kordich

(57) ABSTRACT

A method is disclosed for saving power in a user equipment (UE), which includes discovering at least one available access technology radio access network (RAN) having at least one access technology type, switching off power to a removable Universal Integrated Circuit Card (UICC) having subscription information for a second technology type different from a first technology type when a first technology type RAN is the only access technology RAN available, and establishing access to first technology type RAN user subscription information in a nonvolatile memory (NV) on the UE when a first technology type RAN is the only access technology RAN available.

35 Claims, 6 Drawing Sheets

(56) References Cited

U.S. PATENT DOCUMENTS

| | | |
|---|---|---|
| 2010/0309889 A1* | 12/2010 | Mizusawa .................... 370/336 |
| 2010/0311402 A1 | 12/2010 | Srinivasan et al. |
| 2011/0077031 A1* | 3/2011 | Kim et al. .................... 455/458 |
| 2011/0117909 A1* | 5/2011 | Cao et al. ..................... 455/423 |
| 2011/0269503 A1* | 11/2011 | Park et al. .................. 455/552.1 |
| 2012/0106443 A1* | 5/2012 | Chen et al. .................... 370/328 |
| 2012/0106533 A1* | 5/2012 | Chen et al. .................... 370/342 |
| 2012/0108294 A1* | 5/2012 | Kaul ............................ 455/558 |
| 2013/0005290 A1* | 1/2013 | Geary et al. ............... 455/404.1 |
| 2013/0005291 A1* | 1/2013 | Geary et al. ............... 455/404.1 |
| 2013/0005394 A1* | 1/2013 | Geary et al. ............... 455/552.1 |

FOREIGN PATENT DOCUMENTS

| | | |
|---|---|---|
| JP | 2007324778 A | 12/2007 |
| JP | 2010130589 A | 6/2010 |
| TW | 201018201 A | 5/2010 |
| WO | 2010056944 | 5/2010 |
| WO | 2011063303 A2 | 5/2011 |

* cited by examiner

METHOD AND APPARATUS FOR POWER MANAGEMENT OF UICC

CLAIM OF PRIORITY UNDER 35 U.S.C. §119

The present application for patent claims priority to Provisional Application Ser. No. 61/495,667 entitled "METHOD AND APPARATUS FOR POWER MANAGEMENT OF UICC" filed Jun. 10, 2011, and assigned to the assignee hereof and hereby expressly incorporated by reference herein.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In many mobile devices, subscription information is stored in either a nonvolatile (NV) device memory or a removable Universal Integrated Circuit Card (UICC) depending on the access technology to which the subscription information pertains. Currently, for example, in certain wireless devices, when network service is available on a 1x-RTT/Data Optimized (DO) network technology, network subscription information is stored on and retrieved from the device NV memory. However, in these devices, when service is available on any other access technology—such as GSM, UMTS, or LTE—subscription information is stored on and retrieved from the UICC.

These traditional wireless devices power up the UICC upon device power-up and only power down the UICC when the device is fully powered down. As such, in these devices, the UICC is powered-up and available for querying regardless of the network access technology in use by the wireless device at a given time. The power used for the UICC in such scenarios may be an unnecessary drain on battery life.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes a method for saving power in a user equipment (UE), which includes discovering at least one available access technology radio access network (RAN) having at least one access technology type, switching off power to a removable Universal Integrated Circuit Card (UICC) having subscription information for a second technology type different from a first technology type when a first technology type RAN is the only access technology RAN available, and establishing access to first technology type RAN user subscription information in a nonvolatile memory (NV) on the UE when a first technology type RAN is the only access technology RAN available.

The present disclosure additionally contemplates at least one processor configured to save power in a UE, which includes a first module discovering at least one available access technology RAN having at least one access technology type, a second module for switching off power to a removable UICC having subscription information for a second technology type different from a first technology type when a first technology type RAN is the only access technology RAN available, and a third module for establishing access to first technology type RAN user subscription information in a nonvolatile memory on the UE when a first technology type RAN is the only access technology RAN available.

In an aspect of the present disclosure, described is a computer program product that may include a computer-readable medium, which itself may include a first set of codes for causing a computer to discover at least one available access technology radio access network having at least one access technology type, a second set of codes for causing a computer to switch off power to a removable UICC having subscription information for a second technology type different from a first technology type when a first technology type RAN is the only access technology RAN available, and a third set of codes for causing a computer to establish access to first technology type RAN user subscription information in a nonvolatile memory on the UE when a first technology type RAN is the only access technology RAN available.

Furthermore, the present disclosure contemplates an apparatus that includes means for discovering at least one available access technology RAN having at least one access technology type, means for switching off power to a removable UICC having subscription information for a second technology type different from a first technology type when a first technology type RAN is the only access technology RAN available, and means for establishing access to first technology type RAN user subscription information in a nonvolatile memory on the UE when a first technology type RAN is the only access technology RAN available.

In an additional aspect, provided herein is an apparatus, which includes a system determination component for discovering at least one available access technology radio access network (RAN) having at least one access technology type, a power management component for switching off power to a removable UICC having subscription information for a second technology type different from a first technology type when a first technology type RAN is the only access technology RAN available, and a non-volatile memory for establishing access to first technology type RAN user subscription information when a first technology type RAN is the only access technology RAN available.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
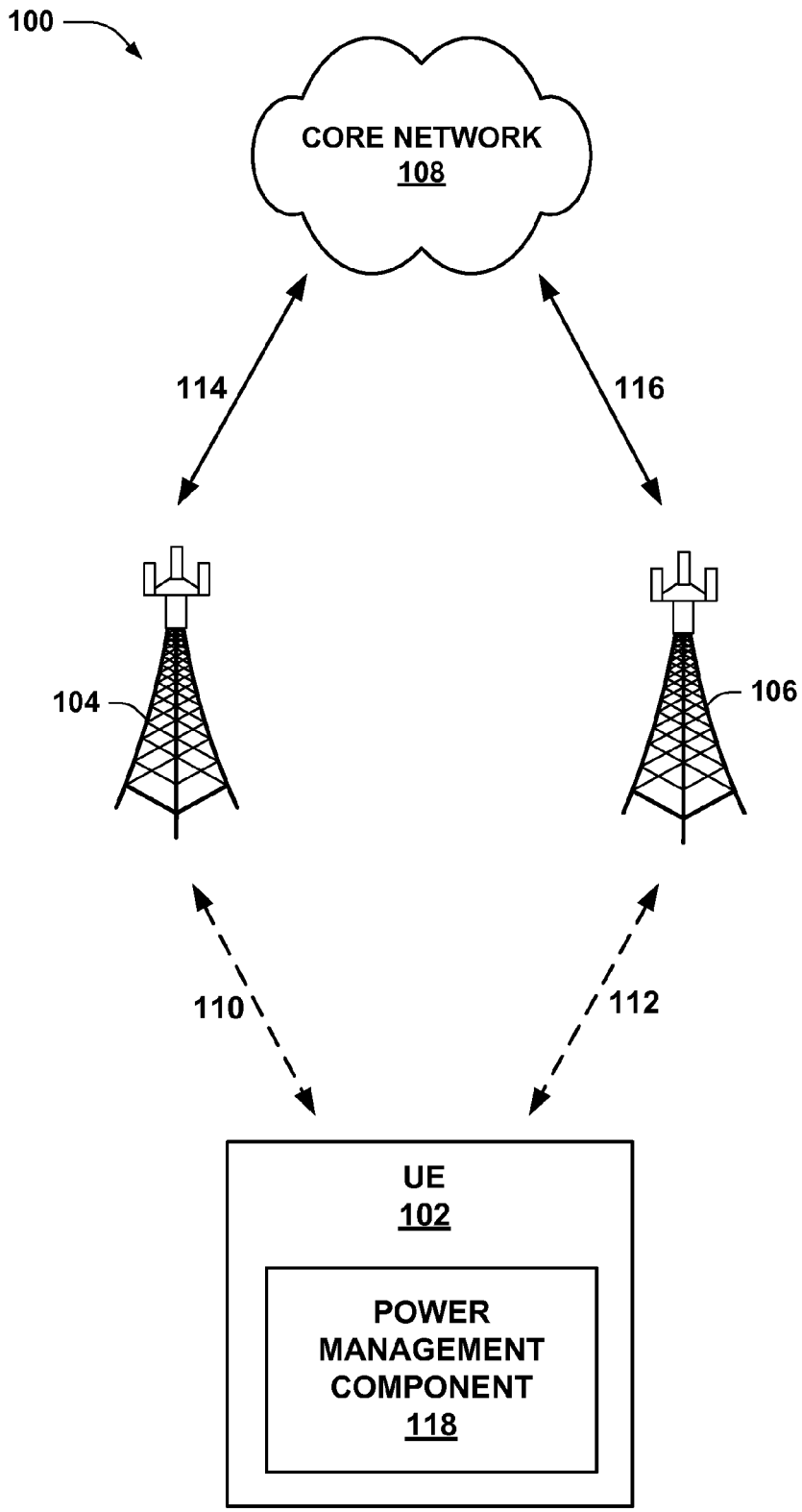
FIG. 1 is a system-level diagram of an aspect of a wireless environment that facilitates UE communication with a core network in the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "environment," "system," and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In FIG. 1, an example wireless communications environment 100 is presented, which may facilitate communication between a core network 108 and user equipment (UE) 102. In example wireless communications environment 100, one or more base stations may communicate with, and provide wireless communication access to, UE 102. In a further aspect, backhaul links 114 and 116 may facilitate communication between core network 108 and one or more of first base station 104 and/or second base station 106.

In some examples, wireless communications environment 100 may include a first base station 104 that may allow communication 112 with one or more UEs 102. In an aspect, communication 112 may be via an over-the-air link. First base station 104 may allow communication 112 with UEs 102 in a radio access network (RAN) via a first access technology. In an aspect, the first access technology may include any access technology that may use a non-volatile memory (NV) for storing network subscription information, such as, but not limited to, CDMA2000 1X (IS-2000), 1x, 1xRTT, CDMA2000, and/or 1xEV-DO (Evolution-Data Optimized), also known as EV-DO or EV, or any other access technology that is part of the 3G access technology family.

Furthermore, wireless communications environment 100 may include a second base station 106 that may allow communication 112 with one or more UEs 102. In an aspect, communication 112 may be via an over-the-air link. Second base station 106 may allow communication 112 with UEs 102 in a RAN via a second access technology. This second access technology may include any access technology that may use a Universal Integrated Circuit Card (UICC) to store network subscription information, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

In an additional aspect, UE 102 may include a power management component 118 that may be configured to control power to a removable Universal Integrated Circuit Card (UICC), which may be located in UE 102. In an aspect, power management component 118 may power on or power off the UICC depending upon which radio access network access technology or technologies are available to the UE 102 at a given time. In an aspect, where a first technology type radio access network is the only access network available, power management component 118 may power off the UICC. In another aspect, if the UICC is powered off and a read operation is requested by a component on UE 102 or a radio access network component, power management component 118 may power on the UICC where a nonvolatile memory on UE 112 does not contain the requested information. Furthermore, in another aspect, UICC may power on the UICC if a write operation to the UICC is requested by a component on UE 102 or a radio access network component. In another aspect, power management component 118 may power off the UICC if, after a read or write operation that triggered a timer period to begin running, the timer period expires, power management component may power off the UICC where a read or write operation was not requested during the timer period and the only available radio access network access technology is the first access technology.

Figure 2:
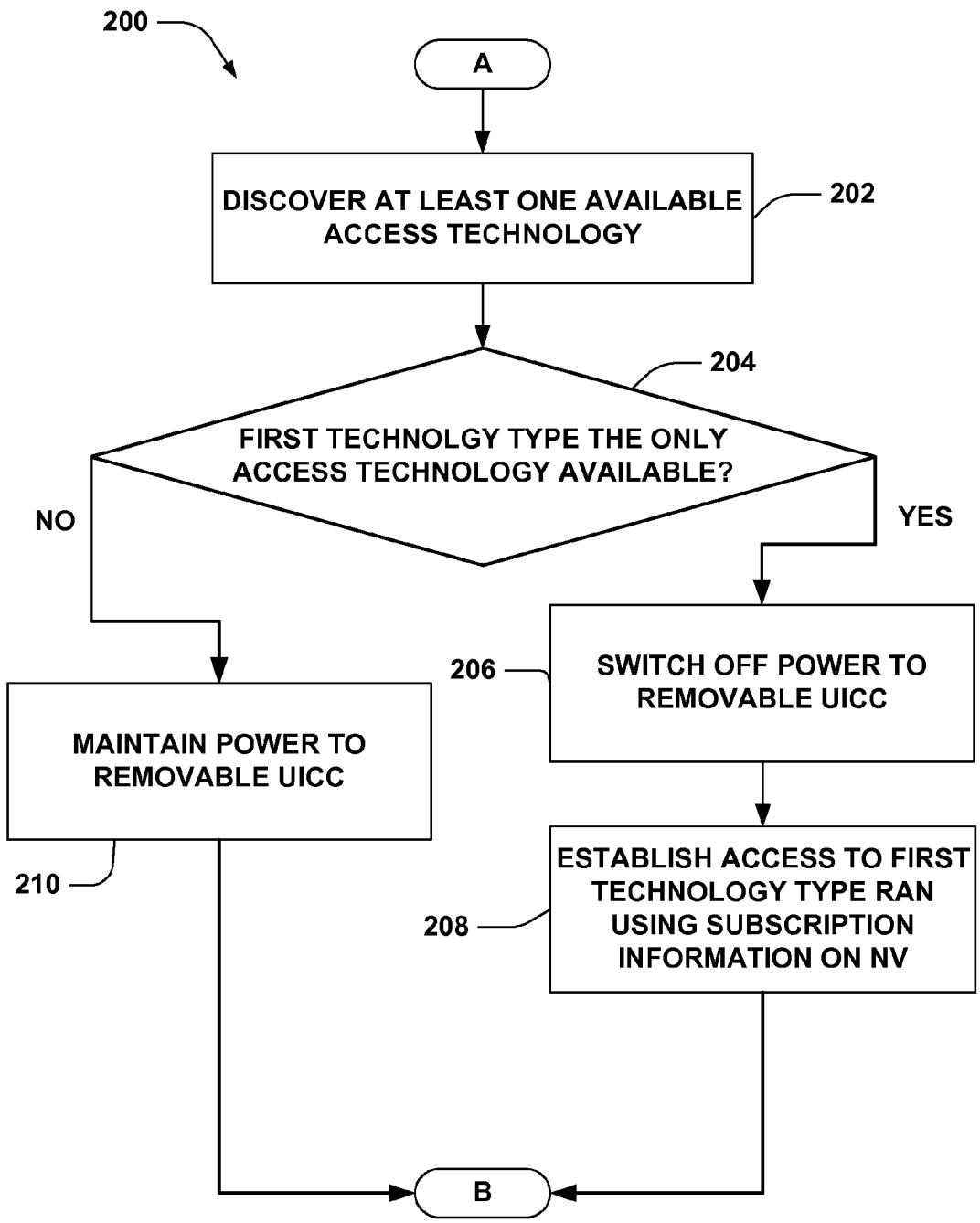
FIG. 2 is a flow chart illustrating a method of selective power management of a UICC in aspects of the present disclosure.

Turning to FIG. 2, a method 200 for UE power regulation based on available access technology is presented. As a UE 102 (FIG. 1) moves through an example wireless communication environment 100 (FIG. 1), the UE may discover at least one available access technology at block 202, which may be made available by first base station 104 and/or second base station 106. When the UE 102 has discovered at least one access technology, the UE may then determine if a first technology type radio access network (RAN) the only access technology type available to the UE 102 at block 204. In an example, the first network technology may include any access technology that may use a non-volatile memory (NV) for storing network subscription information.

In some aspects, UE 102 may contain one or both of a removable UICC or a NV for storing subscription information. Such subscription information may be required for access to an available RAN in a wireless communications environment (e.g., 100, FIG. 1).

In a further aspect of method 200, where the first technology type is the only access technology available to the UE 102, the UE may switch off power to the removable UICC at block 206. Because the first technology type may access subscription information exclusively from the NV, the removable UICC may not be needed for proper connectivity, communication, and operation of the UE where the first access technology is the only access technology available. By switching off power to the UICC in this situation, the UE may exhibit significant power savings which may result in a marked increase in battery life. Additionally, at block 208, UE 102 may establish access to the first technology type RAN using the subscription information contained on the NV, as there is no need to access the removable UICC when connecting to the first access technology type RAN.

Alternatively, the UE may determine that the first access technology type RAN is not the only access technology available at block 204. For example, the UE may detect that a second access technology type is available—for example, a technology type that may store some or all network subscription information on a UICC. In this case, the UE may maintain power to the UICC at block 210, as the network may require this information to be presented before connection to the second access technology type RAN.

Figure 3:
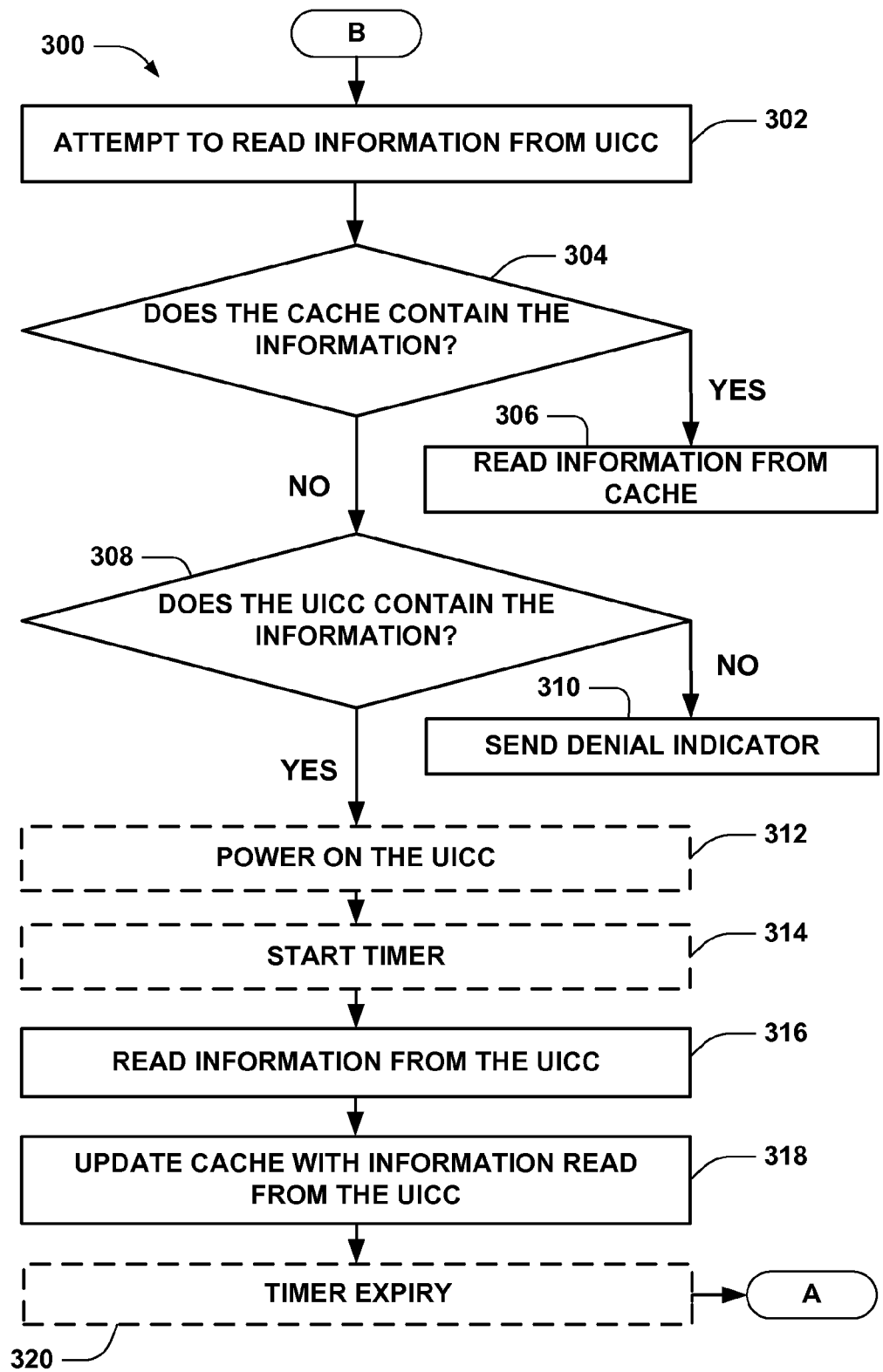
FIG. 3 is a flow chart illustrating a read method in a UE containing a UICC in aspects of the present disclosure.

Turning to FIG. 3, an example method 300 of a read operation from a UE is illustrated. In some examples of the present method, method 300 may be a continuation of method 200 (FIG. 2). In an aspect of method 300, the UE may attempt to read information from a cache on the UE at block 302, which may, for example, contain subscription information previously read from a removable UICC and stored at the cache for later read attempts. In an aspect, the attempt at block 302 may be in response to a subscription information request from a network component. Additionally or alternatively, the cache may include the NV, or vice versa, and therefore both may include subscription information related to the previously-mentioned first access technology.

After the UE attempts to read information from the cache the UE may then determine, at block 304, whether the cache contains the information sought. In an aspect, this information may be subscription information related to connecting with one or more radio access networks (RAN). If the cache does contain the information sought, the UE may read the information from the cache at block 306 and may transmit the information to the requesting device or component.

Where the cache does not contain the information sought, however, the UE may be required to read the information from the removable UICC. For example, where the first access technology is not the exclusive access technology available, the UICC may contain subscription information relevant to a second access technology available to the UICC. In an aspect, the UE may map the location of subscription information and store such mapping information in the cache, processor, or another component of the UE outside of the UICC. By mapping subscription information to a location, the UE is able to discern whether to power on the UICC to retrieve the information or whether doing so would not return the requested subscription information. Therefore, at block 308, the UE may determine whether the UICC contains the requested information, which may be subscription information relevant to a second access technology. If the UICC does not contain this information, at block 310, the UE may send a denial indicator to the requesting entity, which may be a network component in some examples. Additionally or alternatively, the denial indicator message may be sent by a mapping component or entity on the UE to another component on the UE to indicate that the mapping component or entity has determined that the UICC does not contain the requested information.

Alternatively, if the UICC contains the requested information, the UE will attempt to read that information for eventual transmission to a requesting entity on the network. Where the UICC was powered off, at block 206 (FIG. 2), for example, the UICC first must be powered on at block 312. This step is optional, as indicated by the dashed lines in block 312, because the UICC may already be powered on from block 210 (FIG. 2), for example. At the instant that the UICC is powered on, the UICC may start a timer at block 314, which may record and count down the period of time for which the UICC has been powered on. The timer period may be predetermined or configured by a network, UE user, manufacturer, or the like. In an aspect, once this timer period has expired without a read or write request to the UICC having occurred since the beginning of the timer period, the UE may power the UICC off.

Once the UICC has been powered on and timer has started, the UE may read the requested information from the UICC at block 316. In an aspect, this information may include subscription information for a radio access network and may be sent to a requesting network component of the radio access network. In addition, once the information has been read from the UICC, the UE may also update its cache by writing to the cache the information read from the UICC at block 318. As such, subsequent requests for the same information may not require the UE to power on the UICC, which may save power. In an additional aspect, where the timer that may have been started at block 314 expires at block 320, the method 300 may then return to the method 200 outlined in FIG. 2 (represented by Point A in FIGS. 2-4) to again to attempt to discover at least one available access technology in block 202 (FIG. 2).

Figure 4:
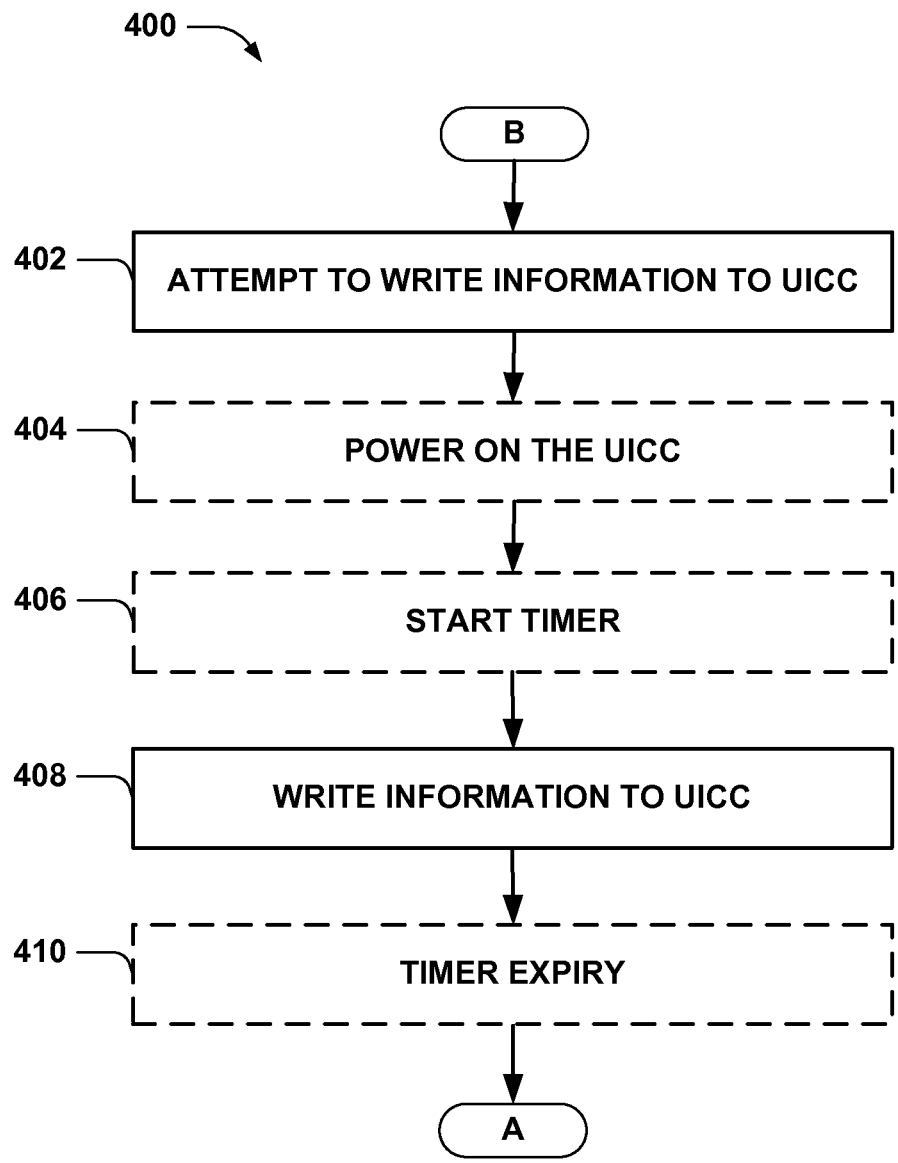
FIG. 4 is a flow chart illustrating a write method in a UE containing a UICC in aspects of the present disclosure.

Turning to FIG. 4, an example method 400 of the present disclosure, which may be a continuation of method 200 (FIG. 2), is presented for writing information to the removable UICC of a UE. In an aspect, a network component may attempt to populate the UE and its removable UICC with connection parameters or other information pertinent to establishing or carrying on communication with a network. Alternatively, the UE may itself contain a memory or processor containing instructions to store information in a removable UICC. These situations are merely exemplary and do not foreclose other devices or modules from attempting to write information to the UICC.

In an aspect of method 400, a UE or network component, for example, may attempt to write information to a UICC. Where the UICC is not powered on when the attempt is made, the UE may optionally power on the UICC at block 404. In addition, at the instant that the UICC is powered on, the UICC may optionally start a timer at block 406, which may record and count down the period of time for which the UICC has been powered on. The timer period may be predetermined or configured by a network, UE user, manufacturer, or the like. In an aspect, once this timer period has expired without a read or write request to the UICC having occurred since the beginning of the timer period, the UE may power the UICC off. Further, to complete the write operation, the UE may write the information to the UICC at block 408. Additionally, where the UICC has maintained power to the UICC, for example, at block 210 (FIG. 2), the UE may perform a write operation at block 408 without powering on the UICC or starting the timer at block 406. In an additional aspect, where the timer that may have been started at block 406 expires at block 410, the method 400 may then return to the method 200 outlined in FIG. 2 (represented by Point A in FIGS. 2-4) to again to attempt to discover at least one available access technology in block 202 (FIG. 2).

Figure 5:
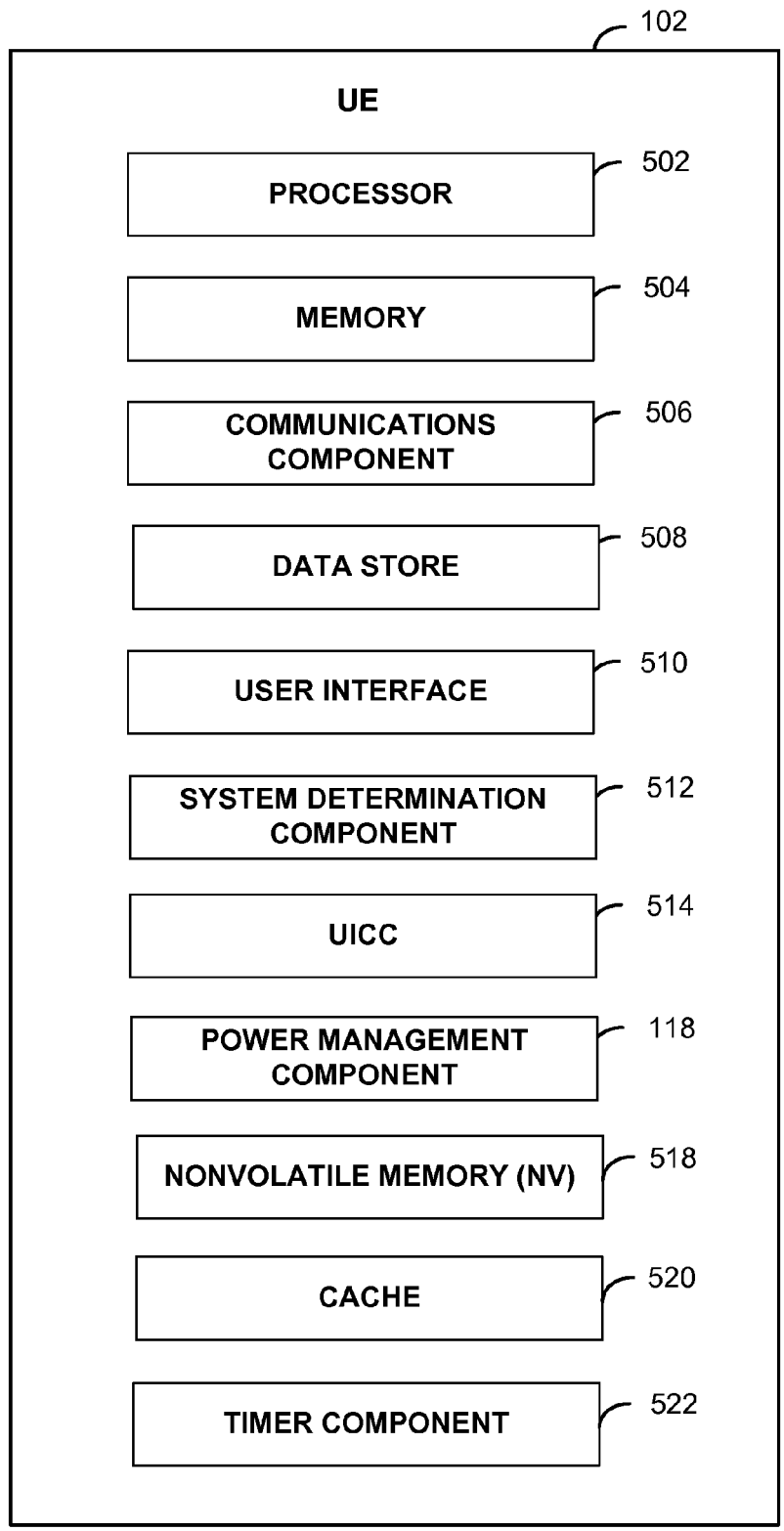
FIG. 5 is a component diagram of a UE in aspects of the present disclosure.

In one aspect, UE 102 (FIG. 1) may be represented by the diagram of FIG. 5. UE 102 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system. Furthermore, processor 502 may house, execute, and/or process instructions related to reading and writing information to and from the UE 102 and/or the components contained therein. For example, in an aspect, processor 502 may generate and send instructions to the UICC, cache, or memory in the UE 102 to cause a cache to be written to or updated with information that has been read from the UICC. Moreover, processor 502 may generate and send commands to a power management component on the UE to power on or power off the UE based upon network conditions or available radio access networks determined by a system determination component.

UE 102 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, UE 102 includes a communications component 506 that provides for establishing and maintaining communications with one or more parties utilizing hardware, software, and services as described herein. Communications component 506 may carry communications between components on UE 102, as well as between UE 102 and external devices, such as devices located across a communications network and/or devices serially or locally connected to UE 102. For example, communications component 506 may include one or more buses, and may further include transmit chain components and receive chain components associated with a transmitter and receiver, respectively, operable for interfacing with external devices.

Additionally, UE 102 may further include a data store 508, which can be any suitable combination of hardware and/or software, that provides for mass storage of information, databases, and programs employed in connection with aspects described herein. For example, data store 508 may be a data repository for applications not currently being executed by processor 502.

UE 102 may additionally include a user interface component 510 operable to receive inputs from a user of UE 102, and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Furthermore, UE 102 may include a system determination component 512, which may be configured to discover one or more available wireless networks. In addition, if system determination component 512 discovers one or more available wireless networks, it may also determine what type of wireless access technology is utilized and/or required for UE connection to the discovered network(s). In an aspect, the determined wireless access technology radio access network (RAN) may utilize, but is not limited to utilizing, a first access technology or second access technology. In an aspect, the first access technology may include any access technology that may use a non-volatile memory (NV) for storing network subscription information, such as, but not limited to, CDMA2000 1x (IS-2000), 1x, 1xRTT, CDMA2000, and/or 1xEV-DO (Evolution-Data Optimized), also known as EV-DO or EV, or any other access technology that is part of the 3G access technology family. Furthermore, the second access technology may include any access technology that may use a Universal Integrated Circuit Card (UICC) or similar device card to store network subscription information, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

In another aspect, UE 102 may include a UICC 514, which may contain subscription, connection, or other information related to wireless communication with a wireless network. In some examples, UICC 514 may be removable, meaning that it may be detached from the UE 102 if removal is needed. In a further aspect, UICC 514 may store personal data for a user. Additionally, the UICC may contain a subscriber identity module (SIM) application, a universal subscriber identity module (USIM), and/or a CDMA subscriber identity module (CSIM) application for network authentication purposes. In some aspects, UICC 514 may contain a removable user identity module (R-UIM), or may itself be referred to as an R-UIM. In some examples, UICC 514 may include an internal central processing unit (CPU), random access memory (RAM), read-only memory (ROM), electrically-erasable programmable read only memory (EEPROM), other non-volatile or volatile memory, and/or input/output circuitry. Additionally, the UICC may contain information related to radio access networks utilizing several access technologies and/or communication protocols, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

Additionally, UE 102 may include a power management component 118 for switching power to UICC 514 on and off. Power management component 516 may receive instructions for switching power to the UICC 514 on and off from processor 502 or any other component in UE 102 and/or components external to UE 102, such as network components. Additionally or alternatively, power management component may receive commands from system determination component 512, as to whether network access conditions require power to UICC 514.

Furthermore, UE 102 may include a nonvolatile memory (NV) component 518. In an aspect, the NV may contain subscription, connection, or any information related to establishing a connection with a wireless network or authenticating a user to such a network. By non-limiting example, such a wireless network may utilize an access technology and/or communication protocol or standard such as, but not limited to, CDMA2000 1X (IS-2000), 1x, 1xRTT, CDMA2000, and/or 1xEV-DO (Evolution-Data Optimized), also known as EV-DO or EV, or any other access technology that is part of the 3G access technology family.

In a further aspect, UE 102 may contain a cache 520, which may store information recently read from UICC 514. Cache 520 may include memory for storing such information, which may any type of memory usable by a computer, such as RAM, ROM, EEPROM, tapes, magnetic discs, optical discs, volatile memory, a general non-volatile memory. In an aspect, cache 520 may include NV 518, and therefore may store contain subscription, connection, or any information related to establishing a connection with a wireless network or authenticating a user to such a network. Again, by non-limiting example, such a wireless network may utilize an access technology and/or communication protocol or standard such as, but not limited to, CDMA2000 1x (IS-2000), 1x, 1xRTT, CDMA2000, and/or 1xEV-DO (Evolution-Data Optimized), also known as EV-DO or EV, or any other access technology that is part of the 3G access technology family. Additionally, because it may contain subscription information read from UICC 514 in the past, cache 520 may include information stored on the UICC 514, such as, but not limited to information related to radio access networks utilizing several access technologies and/or communication protocols, such as, but not limited to, Global System for Mobile Communication (GSM), Enhanced Data Rates for GSM Evolution (EDGE), Universal Mobile Telecommunications System (UMTS), High Speed Packet Access (HSPA), Long Term Evolution (LTE), LTE Advanced, or any other high-speed data packet network access technology, including those access technologies that are part of the 4G access technology family.

In addition, UE 102 may include a timer component 522 for controlling a timer, which may indicate when the UE 102 may power down UICC 514 after a read or write operation on the UICC 514. In an aspect, when such a read or write operation is requested at the UICC 514, timer component 522 may start a timer, which may count down to zero from a preconfigured time or count up from zero to a pre-configured time. If no read or write operations are requested at the UICC 514 during the timer time period, the timer component may indicate to power management component 118, processor 502, UICC 514, or another component that time has expired and the UICC 514 should be powered off.

Figure 6:
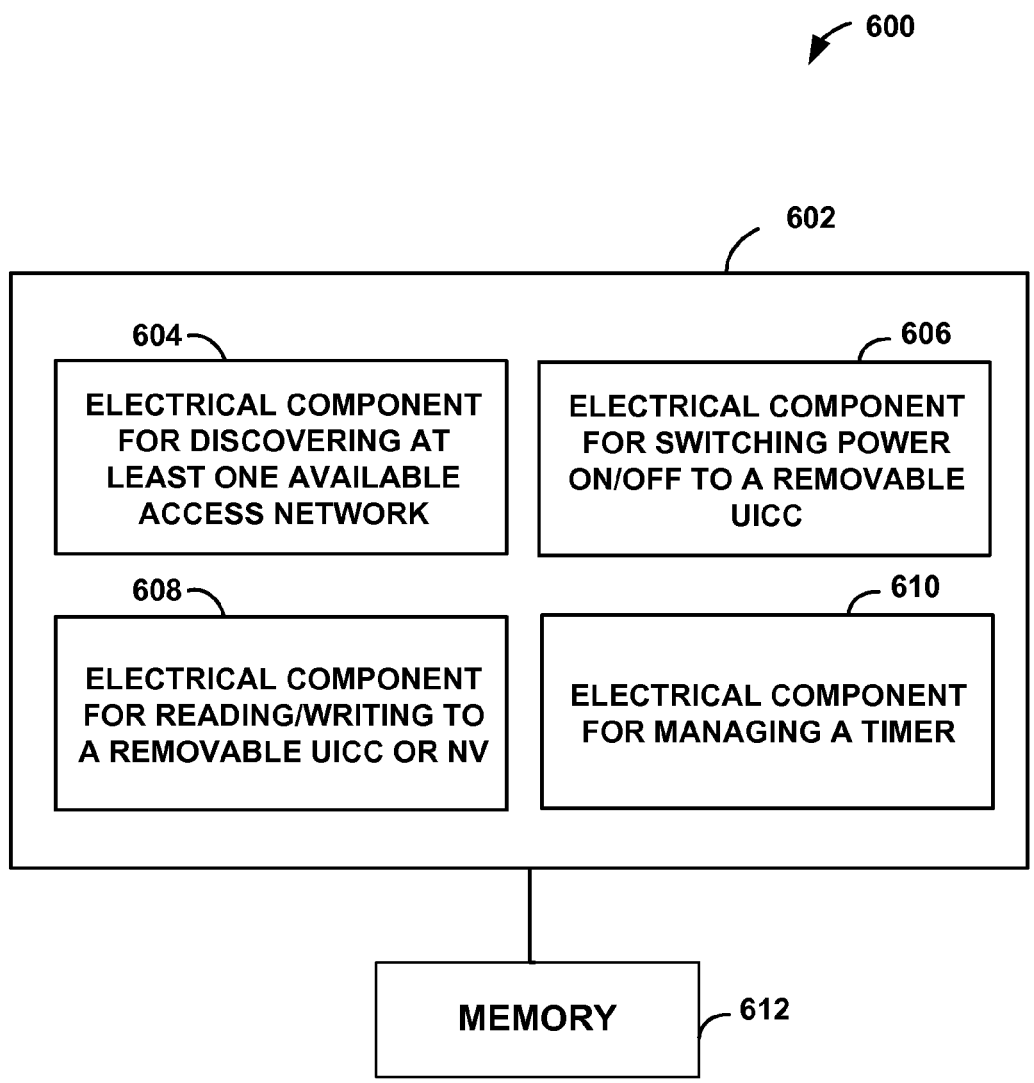
FIG. 6 is a block diagram illustrating electrical components of aspects of the present disclosure.

Referring to FIG. 6, an example system 600 is displayed for selectively powering on and powering off a UICC based on available radio access network access technologies. For example, system 600 can reside at least partially within a device. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For example, logical grouping 602 can include an electrical component for discovering at least one available access network 604. In an aspect, electrical component 604 may determine whether wireless networks are available and may determine which access technologies the available wireless networks utilize. In a further aspect, electrical component 604 may be previously-described system determination component 512 (FIG. 5).

In another aspect, logical grouping 602 may include an electrical component 606 for switching power on and off to a removable UICC. Electrical component 606 may execute commands from external components, such as a processor, or may determine whether to power the UICC on or off depending on an output from electrical component 604. In a further aspect, electrical component 606 may be previously-described power management component 516 (FIG. 5). Furthermore, logical grouping 602 may include an electrical component 608 for reading and/or writing to a removable UICC or nonvolatile memory on a UE. For example, electrical component 608 may write or fetch connection information or parameter information from a UICC when the UICC is powered on, whereas it may write or fetch connection information or parameter information to or from the nonvolatile memory when the UICC is powered off. In an aspect, electrical component 608 may be processor 502 (FIG. 5), a network-side component, or any other component capable of reading or writing data to memory.

In addition, logical grouping 600 may include an electrical component 610 for managing a timer. In an aspect of the present disclosure, electrical component may begin a timer when a read or write operation is performed on a UICC. Additionally, electrical component 610 may count up or count down a predetermined period of time, and, if no additional read or write operations are preformed on the UICC during this period, may indicate that the removable UICC should be powered off. In a further aspect, electrical component 610 may be timer component 522 (FIG. 5).

Additionally, system 600 can include a memory 612 that retains instructions for executing functions associated with the electrical components 604, 606, 608, and 610, stores data used or obtained by the electrical components 604, 606, 608, and 610, etc. While shown as being external to memory 612, it is to be understood that one or more of the electrical components 604, 606, 608, and 610 can exist within memory 612. In one example, electrical components 604, 606, 608, and 610 can comprise at least one processor, or each electrical component 604, 606, 608, and 610 can be a corresponding module of at least one processor. Moreover, in an additional or alternative example, electrical components 604, 606, 608, and 610 can be a computer program product including a computer readable medium, where each electrical component 604, 606, 608, and 610 can be corresponding code.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for saving power in a user equipment (UE), comprising:

discovering that a radio access network (RAN) operating according to a first technology type is an only available RAN, wherein the UE stores subscription information corresponding to the first technology type in a nonvolatile memory (NV) of the UE, and wherein the UE stores subscription information corresponding to a second technology type that is different from the first technology type in a removable Universal Integrated Circuit Card (UICC) of the UE;
switching off power to the UICC based on discovering that the RAN is the only available RAN;
reading the subscription information corresponding to the first technology type from the NV; and
establishing access to the RAN using the subscription information corresponding to the first technology type read from the NV.

2. The method of claim 1, further comprising:
attempting to read information from the UE;
powering on the UICC when a cache does not contain, but the UICC contains, the information the UE is attempting to read;
reading the information from the UICC; and
updating the cache with the information read from the UICC.

3. The method of claim 2, further comprising starting a timer upon powering on the UICC to measure a timer period during which the UICC remains powered on.

4. The method of claim 3, further comprising
powering off the UICC when the RAN operating according to the first technology type is the only available RAN upon expiry of the timer period.

5. The method of claim 1, further comprising:
attempting to write information to the UICC by the UE;
powering on the UICC; and
writing the information to the UICC.

6. The method of claim 5, further comprising starting a timer upon powering on the UICC to measure a timer period during which the UICC remains powered on.

7. The method of claim 6, further comprising
powering off the UICC when the RAN operating according to the first technology type is the only available RAN upon expiry of the timer period.

8. At least one processor configured to save power in a user equipment (UE), comprising:
a first module for discovering that a radio access network (RAN) operating according to a first technology type is an only available RAN, wherein the UE stores subscription information corresponding to the first technology type in a non-volatile memory (NV) of the UE, and wherein the UE stores subscription information corresponding to a second technology type that is different from the first technology type in a removable Universal Integrated Circuit Card (UICC) of the UE;
a second module for switching off power to the UICC based on discovering that the RAN is the only available RAN;
a third module for reading the subscription information corresponding to the first technology type from the NV; and
a fourth module for establishing access to the RAN using the subscription information corresponding to the first technology type read from the NV.

9. The at least one processor of claim 8, further comprising:
a fifth module for attempting to read information from the UE;
a sixth module for powering on the UICC when a cache does not contain, but the UICC contains, the information the UE is attempting to read;
a seventh module for reading the information from the UICC; and
an eighth module for updating the cache with the information read from the UICC.

10. The at least one processor of claim 9, further comprising a ninth module for starting a timer upon powering on the UICC to measure a timer period during which the UICC remains powered on.

11. The at least one processor of claim 10, further comprising
a tenth module for powering off the UICC when the RAN operating according to the first technology type is the only available RAN upon expiry of the timer period.

12. The at least one processor of claim 8, further comprising:
a fifth module for attempting to write information to the UICC by the UE;
a sixth module for powering on the UICC; and
a seventh module for writing the information to the UICC.

13. The at least one processor of claim 12, further comprising an eighth module for starting a timer upon powering on the UICC to measure a timer period during which the UICC remains powered on.

14. The at least one processor of claim 13, further comprising
a ninth module for powering off the UICC when the RAN operating according to the first technology type is the only available RAN upon expiry of the timer period.

15. A computer program product for saving power in a user equipment (UE), comprising:
a non-transitory computer-readable medium comprising:
a first set of codes for causing a computer to discover that a radio access network (RAN) operating according to a first technology type is an only available RAN, wherein the UE stores subscription information corresponding to the first technology type in a non-volatile memory (NV) of the UE, and wherein the UE stores subscription information corresponding to a second technology type that is different from the first technology type in a removable Universal Integrated Circuit Card (UICC) of the UE;
a second set of codes for causing the computer to switch off power to the UICC based on discovering that the RAN is the only available RAN;
a third set of codes for causing the computer to read the subscription information corresponding to the first technology type from the NV; and
a fourth set of codes for causing the computer to establish access to the RAN using the subscription information corresponding to the first technology type read from the NV.

16. The computer program product of claim 15, wherein the non-transitory computer-readable medium further comprises:
a fifth set of codes for causing the computer to attempt to read information from the UE;
a sixth set of codes for causing the computer to power on the UICC when a cache does not contain, but the UICC contains, the information the UE is attempting to read;
a seventh set of codes for causing the computer to read the information from the UICC; and
an eighth set of codes for causing the computer to update the cache with the information read from the UICC.

17. The computer program product of claim 16, wherein the non-transitory computer-readable medium further comprises a ninth set of codes for causing the computer to start a timer upon powering on the UICC to measure a timer period during which the UICC remains powered on.

18. The computer program product of claim 17, wherein the non-transitory computer-readable medium further comprises a tenth set of codes for causing the computer to power off the UICC when the RAN operating according to the first technology type is the only available RAN upon expiry of the timer period.

19. The computer program product of claim 15, wherein the non-transitory computer-readable medium further comprises:
a fifth set of codes for causing the computer to attempt to write information to the UICC by the UE;
a sixth set of codes for causing the computer to power on the UICC; and
a seventh set of codes for causing the computer to write the information to the UICC.

20. The computer program product of claim 19, wherein the non-transitory computer-readable medium further comprises an eighth set of codes for causing the computer to start a timer upon powering on the UICC to measure a timer period during which the UICC remains powered on.

21. The computer program product of claim 20, wherein the non-transitory computer-readable medium further comprises
a ninth set of codes for causing the computer to power off the UICC when the RAN operating according to the first technology type is the only available RAN upon expiry of the timer period.

22. An apparatus for saving power in a user equipment (UE), comprising:
means for discovering that a radio access network (RAN) operating according to a first technology type is an only available RAN, wherein the UE stores subscription information corresponding to the first technology type in a non-volatile memory (NV) of the UE, and wherein the UE stores subscription information corresponding to a second technology type that is different from the first technology type in a removable Universal Integrated Circuit Card (UICC) of the UE;
means for switching off power to the UICC based on discovering that the RAN is the only available RAN;
means for reading the subscription information corresponding to the first technology type from the NV; and
means for establishing access to the RAN using the subscription information corresponding to the first technology type read from the NV.

23. The apparatus of claim 22, further comprising:
means for attempting to read information from the UE;
means for powering on the UICC when a cache does not contain, but the UICC contains, the information the UE is attempting to read;
means for reading the information from the UICC; and
means for updating the cache with the information read from the UICC.

24. The apparatus of claim 23, further comprising means for starting a timer upon powering on the UICC to measure a timer period during which the UICC remains powered on.

25. The apparatus of claim 24, further comprising
means for powering off the UICC when the RAN operating according to the first technology type is the only available RAN upon expiry of the timer period.

26. The apparatus of claim 22, further comprising:
means for attempting to write information to the UICC by the UE;
means for powering on the UICC; and
means for writing the information to the UICC.

27. The apparatus of claim 26, further comprising means for starting a timer upon powering on the UICC to measure a timer period during which the UICC remains powered on.

28. The apparatus of claim 27, further comprising
means for powering off the UICC when the RAN operating according to the first technology type is the only available RAN upon expiry of the timer period.

29. An apparatus for saving power in a user equipment (UE), comprising:
a system determination component for discovering that a radio access network (RAN) operating according a first technology type is an only available RAN, wherein the UE stores subscription information corresponding to the first technology type in a non-volatile memory (NV) of the UE, and wherein the UE stores subscription information corresponding to a second technology type that is different from the first technology type in a removable Universal Integrated Circuit Card (UICC) of the UE;
a power management component for switching off power to the UICC based on discovering that the RAN is the only available RAN;
a non-volatile memory for reading the subscription information corresponding to the first technology type from the NV; and
a communications component for establishing access to the RAN using the subscription information corresponding to the first technology type read from the NV.

30. The apparatus of claim 29, further comprising:
a processor for:
attempting to read information from the UE;
powering on the UICC when a cache does not contain, but the UICC contains, the information the UE is attempting to read;
reading the information from the UICC; and
updating the cache with the information read from the UICC.

31. The apparatus of claim 30, further comprising a timer component for starting a timer upon powering on the UICC to measure a timer period during which the UICC remains powered on.

32. The apparatus of claim 31, wherein
the power management component is configured to power off the UICC when the RAN operating according to the first technology type is the only available RAN upon expiry of the timer period.

33. The apparatus of claim 29, further comprising:
a processor for:
attempting to write information to the UICC by the UE;
powering on the UICC; and
writing the information to the UICC.

34. The apparatus of claim 33, further comprising a timer component for starting a timer upon powering on the UICC to measure a timer period during which the UICC remains powered on.

35. The apparatus of claim 34, wherein
the power management component is configured to power off the UICC when the RAN operating according to the first technology type is the only available RAN upon expiry of the timer period.

* * * * *